US011293434B2

(12) United States Patent
Lee et al.

(10) Patent No.: US 11,293,434 B2
(45) Date of Patent: Apr. 5, 2022

(54) BUSH BEARING HAVING OUTER LUBRICATING LAYER, MANUFACTURING METHOD THEREFOR AND SCROLL COMPRESSOR HAVING SAME APPLIED THERETO

(71) Applicant: LG Electronics Inc., Seoul (KR)

(72) Inventors: Jaeha Lee, Seoul (KR); Jinho Kim, Seoul (KR); Sungyong Ahn, Seoul (KR); Byeongchul Lee, Seoul (KR); Seheon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 16/635,956

(22) PCT Filed: Jul. 30, 2018

(86) PCT No.: PCT/KR2018/008623
§ 371 (c)(1),
(2) Date: Jan. 31, 2020

(87) PCT Pub. No.: WO2019/027206
PCT Pub. Date: Feb. 7, 2019

(65) Prior Publication Data
US 2020/0240409 A1 Jul. 30, 2020

(30) Foreign Application Priority Data

Aug. 2, 2017 (KR) .......................... 10-2017-0098231
Aug. 2, 2017 (KR) .......................... 10-2017-0098233

(51) Int. Cl.
*F16C 17/02* (2006.01)
*F16C 33/20* (2006.01)
(Continued)

(52) U.S. Cl.
CPC ...... *F04C 18/0215* (2013.01); *F04C 29/0057* (2013.01); *F16C 17/02* (2013.01);
(Continued)

(58) Field of Classification Search
CPC ........ F16C 17/02; F16C 33/20; F16C 33/201; F16C 33/203; F16C 33/04; F16C 33/1095;
(Continued)

(56) References Cited

U.S. PATENT DOCUMENTS 3,008,779 A * 11/1961 Spriggs ................... F16C 33/20
384/299
3,033,623 A * 5/1962 Thomson ................ F16C 17/02
384/299

(Continued)

FOREIGN PATENT DOCUMENTS

| JP | 2013145026 | 7/2013 |
|----|------------|--------|
| JP | 2013204646 | 10/2013 |

(Continued)

*Primary Examiner* — Phillip A Johnson
(74) *Attorney, Agent, or Firm* — Fish & Richardson P.C.

(57) ABSTRACT

A bush bearing having an outer lubricating layer, a manufacturing method therefor and a scroll compressor having same applied thereto, according to the present disclosure, includes a bush bearing comprising: a base member which has a cylindrical shape having no separated surfaces along the circumferential direction; and a lubricating member which is formed from a material having a lower rigidity and more excellent lubricity than the base member, and has a cylindrical shape having no separated surfaces along the circumferential direction by being integrally provided to the outer circumferential surface of the base member, wherein the cylindricity of the outer circumferential surface of the lubricating member satisfies a value that is within 0.6% of the average thickness of the lubricating member, and the lubricating member has carbon fiber contained in a resin (Continued)

base, wherein the carbon fiber has cut surfaces exposed on both ends of the lubricating member.

20 Claims, 9 Drawing Sheets

(51) Int. Cl.
F04C 18/02 (2006.01)
F04C 29/00 (2006.01)
(52) U.S. Cl.
CPC .......... F16C 33/20 (2013.01); *F04C 2210/26* (2013.01); *F04C 2240/30* (2013.01); *F04C 2240/40* (2013.01); *F04C 2240/50* (2013.01); *F16C 2360/43* (2013.01); *F16C 2362/52* (2013.01)
(58) Field of Classification Search
CPC .............. F16C 2360/43; F16C 2362/52; F04C 18/0207; F04C 18/0215; F04C 18/0223; F04C 18/023; F04C 18/0238; F04C 29/0057; F04C 2240/50; F04C 2240/56
See application file for complete search history.

(56) References Cited

U.S. PATENT DOCUMENTS

| | | | | |
|---|---|---|---|---|
| 5,009,520 A * | 4/1991 | Takajo | ................... | F16C 17/026 384/100 |
| 5,697,709 A * | 12/1997 | Mori | ...................... | F16C 33/102 384/297 |
| 6,367,151 B1 * | 4/2002 | Schlegel | ................... | C23C 4/16 29/888.09 |
| 2013/0315513 A1* | 11/2013 | Manke | ................... | F16C 33/205 384/13 |
| 2017/0211622 A1* | 7/2017 | Hirayama | ............... | F16C 17/02 |

FOREIGN PATENT DOCUMENTS

| | | | | |
|---|---|---|---|---|
| JP | 6298132 B1 * | 3/2018 | ............ | F16C 33/201 |
| KR | 101016431 | 2/2011 | | |
| KR | 1020120009355 | 2/2012 | | |
| KR | 1020140039655 | 4/2014 | | |
| KR | 101549868 | 9/2015 | | |
| WO | WO-2013145889 A1 * | 10/2013 | ............. | F04B 53/14 |

\* cited by examiner

BUSH BEARING HAVING OUTER LUBRICATING LAYER, MANUFACTURING METHOD THEREFOR AND SCROLL COMPRESSOR HAVING SAME APPLIED THERETO

CROSS-REFERENCE TO RELATED APPLICATIONS

This application is a National Stage application under 35 U.S.C. § 371 of International Application No. PCT/KR2018/008623, filed on Jul. 30, 2018, which claims the benefit of Korean Application No. 10-2017-0098231, filed on Aug. 2, 2017, and Korean Application No. 10-2017-0098233, filed on Aug. 2, 2017. The disclosures of the prior applications are incorporated by reference in their entirety.

TECHNICAL FIELD

The present disclosure relates to a bush bearing for a compressor, a method for manufacturing the same, and a scroll compressor having the same applied thereto.

BACKGROUND ART

In general, a bush bearing is a bearing provided between a rotating member and a supporting member supporting the rotating member in a radial direction, and radially supporting the rotating member with respect to the supporting member.

For such a bush bearing, bimetal, resin material (PTFE, usually Teflon), carbon material and the like are used. Among them, bimetal, resin material, and carbon material are mainly used in a compressor, and a bush bearing of resin material is most widely used. A bush bearing made of bimetal and carbon material is known to have excellent abrasion resistance, and a bush bearing made of resin material is known to be excellent in view of a frictional loss due to its low friction coefficient in terms of a characteristic of resin material.

Meanwhile, a bush bearing disclosed in the Prior Art 1 (Korean Patent No. 10-1016431: BEARING MEMBER) and the Prior Art 2 (Korean Patent Laid-open Publication No. 10-2012-0009355: HERMETIC COMPRESSOR) is formed in a cylindrical shape in which a lubricating member made of a lubricating material is laminated or coated on an inner circumferential surface of a base member made of metal to form a back steel. For such a bush bearing, a method for manufacturing the bush bearing by rolling it as a cylindrical shape after applying the lubricating member to a wide steel sheet as in the Prior Art 2 is mainly known. In addition, there is also known a method for manufacturing the bush bearing by inserting a C-ring shaped steel sheet into an outer circumferential surface of a cylindrical lubricating member or press-fitting the cylindrical lubricating member into a cylindrical back steel. However, these latter are relatively complicated compared to the former, which makes them unsuitable for mass production systems.

Also, in the scroll compressor to which the bush bearing as described above is applied, an eccentric portion of a rotating shaft is inserted into a boss portion provided in a second scroll, so that a rotational force of a driving motor is transmitted to the second scroll. In this case, the rotating shaft is inserted into a shaft hole of a main frame supporting the second scroll and is supported in the radial direction, while a first wrap provided in a first scroll and a second wrap provided in the second scroll are engaged with each other to form a pair of compression chambers.

When power is applied to the driving motor to generate rotational force, such a scroll compressor sucks in, compresses, and discharges a refrigerant as the second scroll performs an orbiting motion with respect to the first scroll by the rotating shaft to form a pair of compression chambers.

Here, the second scroll may behave unstably as receiving a centrifugal force generated by the orbiting movement and a gas force generated while the refrigerant is compressed, and receiving a gas repulsive force in a direction opposite to the centrifugal force, but continues to perform the orbiting motion as the rotating shaft is properly adjusted by being supported in an opposite direction by the main frame.

In the related art scroll compressor as described above, while a middle portion of the rotating shaft is supported by the main frame, the eccentric portion provided at an upper end of the rotating shaft is coupled to the orbiting scroll, so that a height difference between a support point where the rotating shaft is supported by the main frame and an action point where the rotating shaft applies the rotational force to the second scroll becomes greater. Accordingly, the rotating shaft is subjected to a large eccentric load to increase a bearing load due to the gas force, thereby lowering compression efficiency. In addition, noise of the compressor is increased, reliability is lowered, and a length of the main frame is increased to increase a size of the compressor.

Thus, in the related art, a method for a boss coupling groove to be formed at the upper end of the rotating shaft to be eccentric with respect to a center of the rotating shaft, and the boss portion of the second scroll to be inserted into the boss coupling groove is disclosed. In this case, as the support point supporting the rotating shaft and the action point where the rotational force is transferred to the second scroll are located at a same height, the eccentric load applied to the rotating shaft is reduced such that the frictional loss at the bearing supporting the rotating shaft and noise of the compressor can be reduced, reliability of the bearing can be enhanced, and the compressor can be reduced in size.

In the related art scroll compressor as described above, the bush bearing should be provided between an outer circumferential surface of the boss portion and an inner circumferential surface of the boss coupling groove. But this bush bearing was typically press-fitted into the inner circumferential surface of the boss coupling groove. This is because the bush bearing should be press-fitted into the inner circumferential surface of the boss coupling groove so that the bush bearing can be effectively restrained from being detached or being idled even when the bush bearing is thermally expanded by an operating heat of the compressor. When the bush bearing is press-fitted into the outer circumferential surface of the boss portion, plastic deformation may occur during the press-fitting process depending on a press-fitted range, and thus a coupling force may be weakened or the bush bearing may be detached from the boss portion or be idled due to the thermal expansion by the operating heat.

However, in the related art scroll compressor as described above, when the bush bearing is press-fitted into the boss coupling groove, the inner circumferential surface of the bush bearing forms a bearing surface. But this may result in shortening a lifespan of the bearing due to one point of the bearing surface being rubbed in a concentrated manner.

Accordingly, the Prior Art 3 registered in Korea on Aug. 28, 2015 (Korean Registration Patent Application No. 101549868, BUSH BEARING FOR COMPRESSOR AND SCROLL CONPRESSOR HAVING THE SAME) has disclosed an example in which the bush bearing is inserted into the outer circumferential surface of the boss portion.

In the Prior Art 3, a single bush bearing in which the bush bearing is formed only of the lubricating material or a double bush bearing in which the lubricating member of the lubricating material is provided on the outer circumferential surface of a base member of methyl material is introduced. And, in the Prior Art 3, material property or structure of the lubricating member is limited so that the single bush bearing or the double bush bearing is stably press-fitted or inserted into the boss portion of the orbiting scroll. Therefore, a manufacturing method for dimensional control of the bush bearing, in particular the lubricating member is not mentioned in the Prior Art 3.

However, for the related art bush bearing, a so-called 'internally lubricated-type bush bearing' in which the lubricating member is provided on the inner circumferential surface of the base member is mainly known or commercialized as described above, but a so-called 'externally lubricated-type bush bearing' in which the lubricating member is provided on the outer circumferential surface of the base member is not widely known or commercialized. This is because, in the case of the externally lubricated-type bush bearing, when the lubricating member is stacked or applied on a wide steel sheet and rolled into a cylindrical shape so that the lubricating member becomes an outer circumferential surface to form the bush bearing, both ends of the lubricating member constituting the outer circumferential surface have slit-shaped separated surfaces, and gaps between the separated surfaces increase as a thickness of the lubricating member increases, and this limits the outer circumferential surface to be used as a lubricating layer.

In addition, the related art bush bearing only limits the material property of the lubricating member as described above, and has a problem that an outer diameter of the lubricating member deviates from an original design value in a manufacturing process and increases, which causes frictional loss on the bearing surface, and the lifespan of the bush bearing is shortened as a part of the lubricating member is worn out.

In addition, in the scroll compressor to which the related art bush bearing is applied, the thickness of the lubricating member is not constant in the bush bearing, which makes a degree of thermal expansion of the lubricating member to be changed by positions due to the operating heat generated during operation of the compressor, so that a part thereof is subject to more severe frictional loss or abrasion.

DETAILED DESCRIPTION OF THE DISCLOSURE

Technical Problem

An aspect of the present disclosure is to provide a bush bearing having an outer lubricating layer, wherein a lubricating member forms an outer circumferential surface without separated surfaces, a manufacturing method therefor, and a scroll compressor having same applied thereto.

Another aspect of the present disclosure is to provide a bush bearing having an outer lubricating layer, wherein a lubricating member forms an outer circumferential surface without separated surfaces and has a uniform thickness, a manufacturing method therefor, and a scroll compressor having same applied thereto.

Still another aspect of the present disclosure is to provide a bush bearing having an outer lubricating layer capable of maintaining a uniform gap between an outer circumferential surface of the bush bearing and an inner circumferential surface of a boss coupling groove when the bush bearing is press-fitted into a boss portion of an orbiting scroll which is inserted into the boss coupling groove of a rotating shaft and the outer circumferential surface of the bush bearing forms a bearing surface, a manufacturing method therefor, and a scroll compressor having same applied thereto.

Still another aspect of the present disclosure is to provide a bush bearing having an outer lubricating layer capable of minimizing frictional loss between a boss coupling groove and a boss portion of an orbiting scroll and minimizing abrasion of the bush bearing by maintaining an outer diameter of the bush bearing uniformly to prevent the outer diameter of the bush bearing from being more non-uniformed even when a high operating heat is generated during operation of a compressor, a manufacturing method therefor, and a scroll compressor having same applied thereto.

Technical Solution

In order to achieve the aspects and other advantages of the present disclosure, there is provided a bush bearing having an outer lubricating layer, wherein a lubricating member made of a lubricating material is injection-molded on an outer circumferential surface of a cylindrical base member but has cut surfaces on both ends thereof.

Also, in order to achieve the aspects and other advantages of the present disclosure, there is provided a bush bearing having an outer lubricating layer including: a base member having a cylindrical shape without separated surfaces along a circumferential direction; and a lubricating member made of a material having a lower rigidity and more excellent lubricity than the base member, and having a cylindrical shape without separated surfaces along the circumferential direction by being integrally provided on an outer circumferential surface of the base member, wherein a cylindricity of an outer circumferential surface of the lubricating member satisfies a value that is within 0.6% of an average thickness of the lubricating member.

Here, a difference in outer diameters of both ends of the lubricating member may be within 3% of the outer diameter of the lubricating member.

In addition, the outer circumferential surface of the base member may be provided with a knurling portion to increase a contact area with the inner circumferential surface of the lubricating member.

When a thickness of the base member is a, a thickness of the lubricating member is b, and a depth of the knurling portion is c, they may be formed to satisfy the following ranges.

$b/a = 1.09$ to $1.15$, $c/a = 0.3$ to $0.5$

Here, the lubricating member has carbon fibers contained in a resin base, the resin base is made of polyether ether ketone (PEEK) material, the carbon fibers are arranged in a lengthwise direction of the base member, and the carbon fibers have cut surfaces exposed on both ends of the lubricating member.

Here, the lubricating member may have cut surfaces on both ends thereof.

Here, a cylindricity of the outer circumferential surface of the lubricating member satisfies a value that is within 0.3% of an average thickness of the lubricating member after the lubricating member is exposed at 210° C. for 2 hours.

Also, in order to achieve the aspects and other advantages of the present disclosure, there is provided a bush bearing having an outer lubricating layer, wherein a lubricating member containing carbon fibers has a cylindrical shape without separated surfaces along a circumferential direction, and a cylindricity of an outer circumferential surface of the lubricating member satisfies a value that is within 0.3% of an average thickness of the lubricating member after the lubricating member is exposed at 210° C. for 2 hours.

In addition, in order to achieve the object of the present disclosure, there is provided a manufacturing method for a bush bearing having an outer lubricating layer, the method including: an injection step of injecting a lubricating member made of a lubricating material on an outer circumferential surface of a base member; a primary processing step of cutting an outer diameter of the injected lubricating member; a heat treatment step of performing heat treatment on the primarily-processed lubricating member; and a secondary processing step of cutting the outer diameter of the heat-treated lubricating member.

Here, the injection step may be performed to inject polyether ether ketone (PEEK) and carbon fibers constituting the lubricating member together.

And, the injection step may be performed to form an over-molding portion on an end portion, which is opposite to a side where a material constituting the lubricating member is injected, to be longer than an end portion of the base member, and the primary processing step may be performed to remove the over-molding portion in a cutting manner.

In addition, a processing thickness in the primary processing step may be greater than a processing thickness in the secondary processing step.

Also, in order to achieve the aspects and other advantages of the present disclosure, there is provided a scroll compressor including: a first scroll having a first wrap formed on one side surface of a first disk portion; a second scroll having a second wrap formed on one side surface of a second disk portion and engaged with the first wrap to form a compression chamber, wherein a boss portion is formed on another side surface of the second disk portion; a rotating shaft provided with a boss coupling groove into which the boss portion of the second scroll is inserted; and a bush bearing having an outer lubricating layer, press-fitted into an outer circumferential surface of the boss portion so that an outer circumferential surface thereof forms a bearing surface with an inner circumferential surface of the boss coupling groove, wherein the bush bearing includes a bush bearing described above.

Here, a variation rate of a distance between an outer circumferential surface of the bush bearing and the inner circumferential surface of the boss coupling groove may satisfy a value that is within 0.4% of an average thickness of the bush bearing.

Also, the base member may be made of a material having a heat transfer coefficient equal to or less than that of the boss portion of the second scroll, and the base member may be made of a material having a material property same as that of the boss portion of the second scroll.

In addition, the base member and the lubricating member may be formed in a shape without a cut surface along a circumferential direction.

Also, in order to achieve the aspects and other advantages of the present disclosure, there is provided a scroll compressor including: a first scroll having a first wrap formed on one side surface of a first disk portion; a second scroll having a second wrap formed on one side surface of a second disk portion and engaged with the first wrap to form a compression chamber, wherein a boss portion is formed on another side surface of the second disk portion; a rotating shaft provided with a boss coupling groove into which the boss portion of the second scroll is inserted; and a bush bearing having an outer lubricating layer, press-fitted into an outer circumferential surface of the boss portion so that an outer circumferential surface thereof forms a bearing surface with an inner circumferential surface of the boss coupling groove, wherein the bush bearing includes: a base member formed in a cylindrical shape and press-fitted into an outer circumferential surface of the boss portion; and a lubricating member integrally provided on an outer circumferential surface of the base member to form a lubricating layer, wherein the lubricating member has carbon fibers contained in a resin base, and the carbon fibers have cut surfaces exposed on both ends of the lubricating member.

Advantageous Effects

The present disclosure may minimize thermal deformation of a bush bearing caused by a cutting heat generated in processing to minimize changes in cylindricity of an outer circumferential surface between both ends of the bush bearing by proceeding a primary processing of cutting an outer circumferential surface of a material that has been made by insert-injecting a lubricating member at an outer circumferential surface of a base member, and then proceeding a secondary processing of cutting again the outer circumferential surface after performing annealing heat treatment on the insert-injected material.

The present disclosure also may suppress a part of the lubricating member from being swollen by forming an over-molding portion when insert-injecting the lubricating member into the base member of the bush bearing to agglomerate carbon fibers included in the insert-injected material in the over-molding portion by vortex, and cutting and removing the over-molding portion during processing.

In addition, the present disclosure may precisely control an outer diameter of the bush bearing since a change in the outer diameter of the bush bearing is not big, and thus reliability of the bush bearing is enhanced.

Further, in the present disclosure, when the bush bearing is pressed into a boss portion of an orbiting scroll and the outer circumferential surface of the bush bearing is inserted into a boss coupling groove of an orbiting shaft and brought into contact with the bearing, the bush bearing can be restrained from being detached or being idled due to thermal expansion during an operation and the cylindricity of the outer circumferential surface of the lubricating member maintains within an appropriate range since the base member forming an inner circumferential surface of the bush bearing is made of a material having a material property same or similar to that of the boss portion. This may result in preventing frictional loss or abrasion. In addition, as the lubricating member is provided on the outer circumferential surface of the base member to form the inner circumferential surface and a bearing surface of the boss coupling groove, an entire outer circumferential surface of the lubricating member is brought into contact with the inner circumferential surface of the boss coupling groove, thereby extending a lifespan of the bearing.

Also, in the present disclosure, as the outer diameter of the bush bearing is maintained substantially constant along a lengthwise direction, frictional loss or abrasion between the boss portion of the orbiting scroll and the boss coupling groove of the rotating shaft may be suppressed, and accordingly a performance and a lifespan of the compressor may be enhanced and extended.

In addition, in the present disclosure, since the thickness of the lubricating member constituting the outer circumferential surface of the bush bearing is kept substantially constant along the lengthwise direction, a significant thermal deformation in a part of the lubricating member may be prevented even when high operating heat is generated during operation of the compressor. In this way, frictional loss or abrasion between the boss portion of the orbiting scroll and the boss coupling groove of the rotating shaft may be effectively suppressed to enhance and extend the performance and the lifespan of the compressor.

MODES FOR CARRYING OUT PREFERRED EMBODIMENTS

Description will now be given in detail of a bush bearing having an outer lubricating layer and a manufacturing method therefor according to an exemplary embodiment disclosed herein, with reference to the accompanying drawings.

The bush bearing according to the present disclosure may also be applied to a case where the bush bearing is manufactured only with a lubricating member having lubricity. However, the present disclosure may also be applied to a case where the bush bearing is manufactured in a manner that the lubricating member is applied or stacked on an outer circumferential surface of a base member made of metal as described in this embodiment. Hereinafter, the latter case will be described as a representative example.

Figure 1:
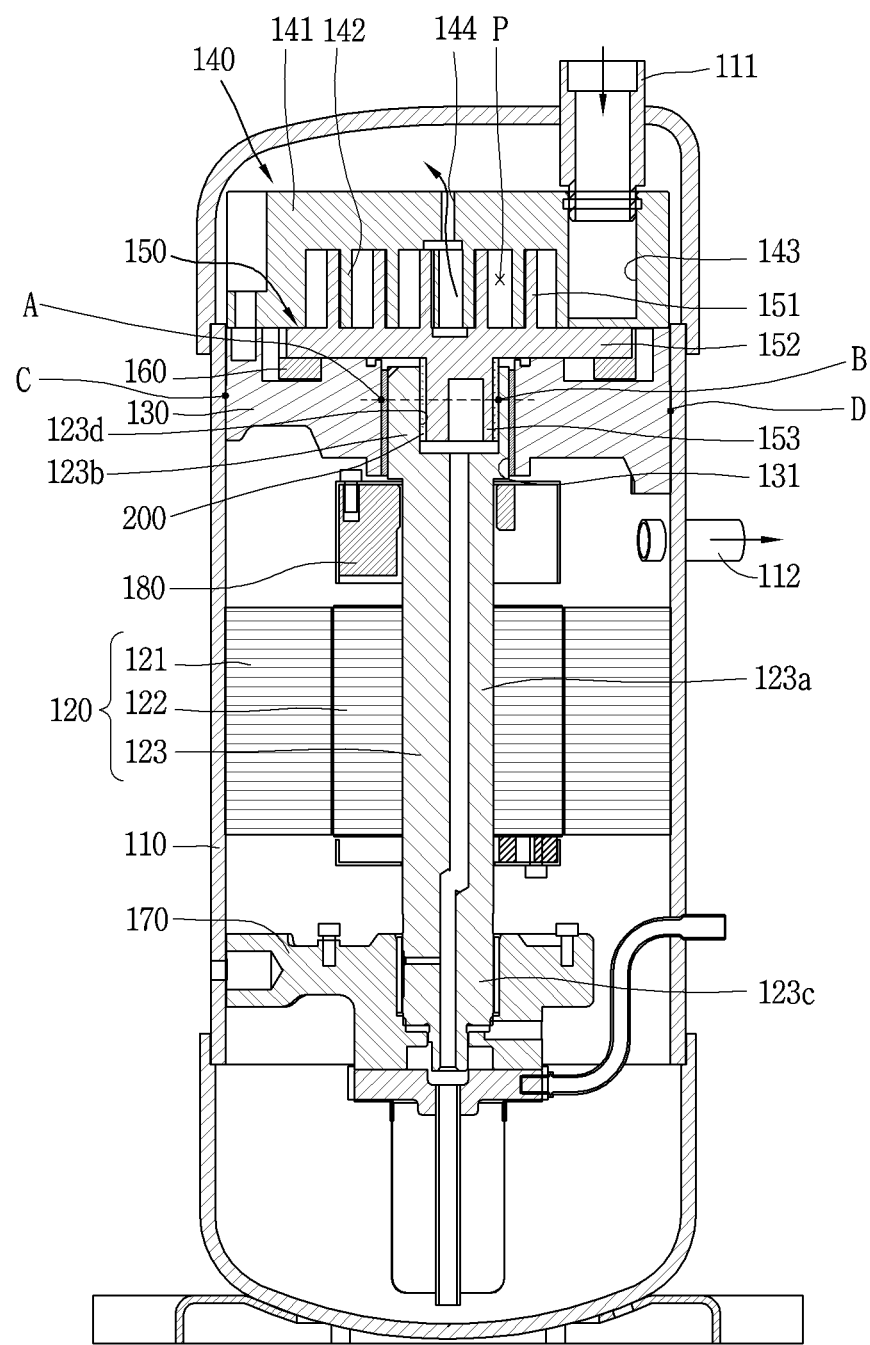
FIG. 1 is a longitudinal sectional view of a scroll compressor according to the present disclosure.
Figure 2:
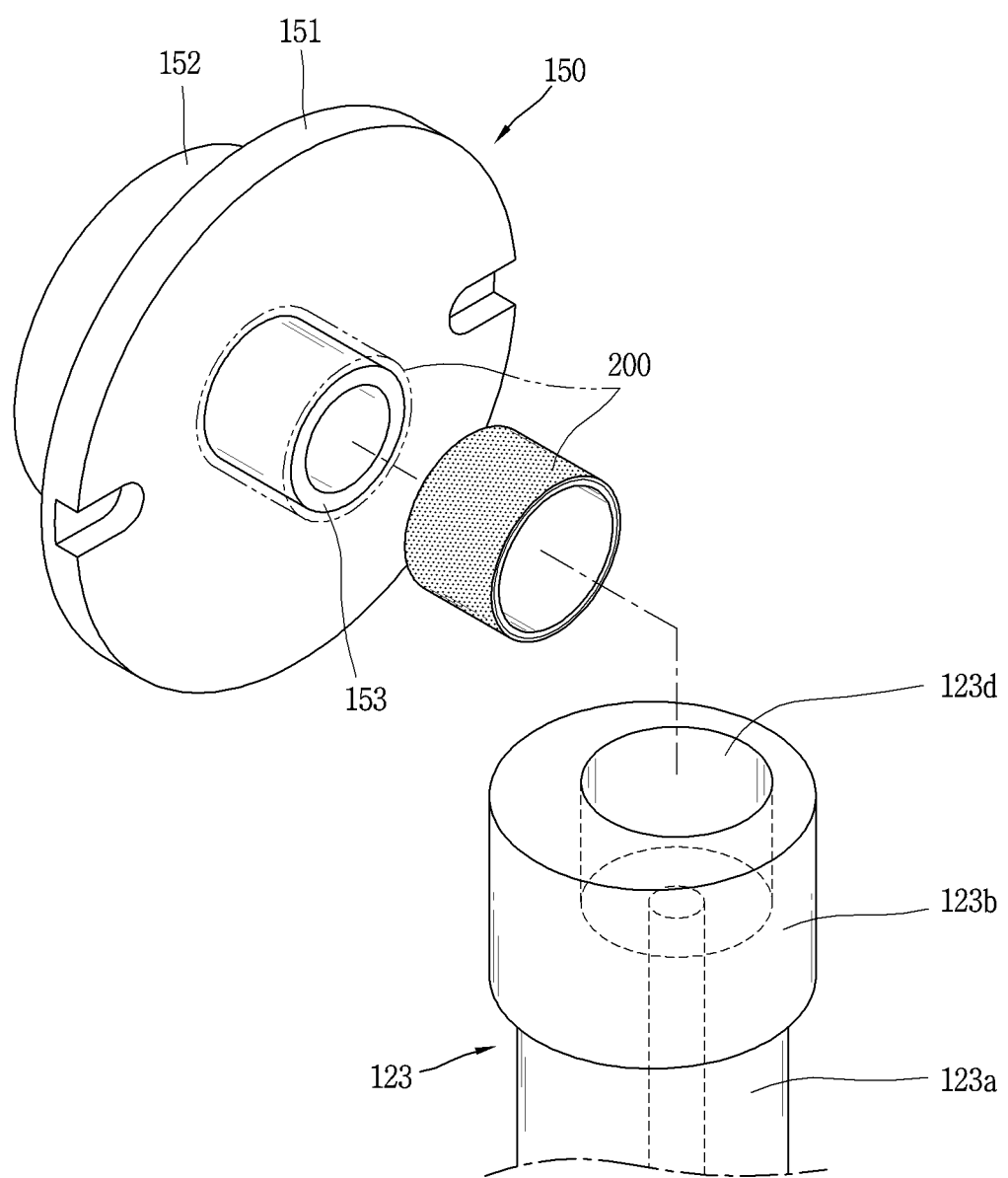
FIG. 2 is a perspective view illustrating an orbiting scroll, separated from a rotating shaft, in the scroll compressor according to FIG. 1.

FIG. 1 is a longitudinal sectional view of a scroll compressor according to the present disclosure, and FIG. 2 is a perspective view illustrating an orbiting scroll, separated from a rotating shaft, in the scroll compressor according to FIG. 1.

As illustrated in those drawings, the scroll compressor according to this embodiment may include a driving motor 120 disposed at an inner space of a casing 110 to generate rotational force, and a main frame 130 fixed to an upper side of the driving motor 120. A fixed scroll 140 may be fixed to an upper surface of the main frame 130, an orbiting scroll 150 may be installed between the main frame 130 and the fixed scroll 140, and the orbiting scroll 150 may be eccentrically coupled to a rotating shaft 123 of the driving motor 120 to form a pair of compression chambers P which continuously moves at a place between the orbiting scroll 150 and the fixed scroll 140. An Oldham ring to prevent rotation of the orbiting scroll 150 may be installed between the fixed scroll 140 and the orbiting scroll 150.

The main frame 130 may be welded onto an inner circumferential surface of the casing 110, and a shaft accommodating hole 131 may be formed through a center of the main frame 130. The shaft accommodating hole 131 may have a same diameter from an upper end to a lower end thereof.

The fixed scroll 140 may protrude from a lower surface of a disk portion 141 thereof and may be provided with a fixed wrap 142 to form a compression space P together with an orbiting wrap 152 of the orbiting scroll 150 to be described later, and a suction port 143 may be formed at the disk portion 141 of the fixed scroll 140 to communicate a suction pipe 111 with the compression space P.

A discharge port 144 may be formed at a center of the disk portion 141 of the fixed scroll 140 so that the compression space P and an inner space of the casing 110 communicate with each other. And a check valve (not shown), which opens the discharge port 144 when the compressor performs a normal operation, and closes the discharge port 144 to prevent a discharged refrigerant from flowing back into the compression space P through the discharge port 144 when the operation of the compressor is stopped, may be installed at an end portion of the discharge port 144.

The orbiting scroll 150 may protrude from an upper surface of a disk portion 151 thereof and may be provided with the orbiting wrap 152 to form a pair of compression spaces P in engagement with the fixed wrap 142 of the fixed scroll 140, and a boss portion 153 may be formed at a lower surface of the disk portion 151 of the orbiting scroll 150 so as to receive the rotational force by being inserted into a boss coupling groove 123d of the rotating shaft 123 to be described later.

The boss portion 153 may be formed at a geometric center of the orbiting scroll 150. And although the boss portion 153 may be formed in a circular rod shape, the boss portion 153 may be formed in a hollow cylindrical shape in order to lower a weight of the orbiting scroll 150.

The rotating shaft 123 may include a shaft portion 123a press-fitted into a rotor 122 of the driving motor 120, a main bearing portion 123b and a sub bearing portion 123c which are provided at both upper and lower sides of the shaft portion 123a and supported by the main frame 130 and a sub frame 170, and the boss coupling groove 123d eccentrically formed at an upper end of the main bearing portion 123b so that the boss portion 153 of the orbiting scroll 150 is inserted thereinto. An eccentric mass 180 may be coupled to the main bearing portion 123b or the shaft portion 123a to offset an eccentric load generated while the orbiting scroll 150 performs an orbiting motion.

In the drawings, unexplained reference numeral 112 denotes a discharge pipe, and 121 denotes a stator.

The scroll compressor according to this embodiment may provide the following operation effects.

That is, when power is applied to the driving motor 120 to generate rotational force, the orbiting scroll 150 eccentrically coupled to the rotating shaft 123 performs an orbiting motion. During the orbiting motion, a pair of compression chambers P which continuously moves is formed between the orbiting scroll 150 and the fixed scroll 140.

Then, the compression space P is formed consecutively in a plurality of stages in which a volume of the compression space P is gradually reduced in a direction from the suction port 143 (or suction chamber) toward the discharge port 144 (or discharge chamber).

A refrigerant supplied from outside of the casing 110 then flows through the suction port 143 of the fixed scroll 140 via the suction pipe 111. This refrigerant is compressed while being moved toward a final compression space by the orbiting scroll 150. The refrigerant is then discharged from the final compression space into an inner space of the casing 110 through the discharge port 144 of the fixed scroll 140. This series of processes is repeatedly performed.

Here, as illustrated in FIG. 1, as the boss portion 153 of the orbiting scroll 150 is inserted into the boss coupling groove 123d of the rotating shaft 123, a height difference Δh between a support point A at which the rotating shaft 123 is supported by the main frame 130 and an action point B at which the rotating shaft 123 acts on the orbiting scroll 150 may be removed (Δh=0). Accordingly, an eccentric load applied to the rotating shaft 123 may be reduced, which may result in reducing abrasion resistance in the main bearing 123b to improve compression efficiency. In addition, an action force at welding points C, D between the casing 110 and the main frame 130 can be lowered, thereby reducing compressor noise and improving reliability.

In addition, material costs and a weight of the eccentric mass 180 coupled to the rotating shaft 123 can be reduced by reducing the eccentric load applied to the rotating shaft 123, and compression efficiency can be improved by reducing a deformation amount of the rotating shaft 123. In addition, the action force at the welding points C, D between the casing 110 and the main frame 130, which is generated due to the centrifugal force of the eccentric mass 180, can also be reduced, thereby reducing compressor noise and improving reliability.

Furthermore, since a separate pocket groove is not required in the main frame 130, an axial length and a diameter of the main frame 130 can be reduced. This may result in reducing material costs and simultaneously reducing a size of the compressor relative to a same capacity. In addition, a stacking height of a motor can be increased within a limited axial length of the compressor so as to improve compressor performance.

Meanwhile, a bush bearing 200 to lubricate between the boss portion 153 and the boss coupling groove 123d may be installed between the boss portion 153 of the orbiting scroll 150 and the boss coupling groove 123d of the rotating shaft 123.

In addition to the bush bearing 200, a needle bearing, a roller bearing, a ball bearing, and the like may be applied. However, since these bearings are large in size, the shaft accommodating hole 131 of the main bearing becomes large to increase frictional loss, applying the bush bearing as this embodiment may be preferable.

It may be better for the bush bearing 200 according to this embodiment to be coupled to the boss portion 153 of the orbiting scroll 150 than to be coupled to an inner circumferential surface of the boss coupling groove 123d. That is, when the bush bearing 200 is coupled to the boss portion 153, an entire outer circumferential surface of the bush bearing 200 is brought into contact with the inner circumferential surface of the boss coupling groove 123d. This may prevent abrasion of the bush bearing 200 which may be occurred when any one point of the bush bearing 200 is in intensive contact to significantly reduce a damage of the bush bearing 200 due to abrasion.

For example, when the boss portion 153 of the orbiting scroll 150 is inserted into the boss coupling groove 123d of the rotating shaft 123, the rotating shaft 123 rotates in a state where a center of the rotating shaft 123 matches a center of the boss portion. Therefore, the inner circumferential surface of the boss coupling groove 123d is brought into contact with an entire outer circumferential surface of the boss portion 153 at one point. That is, the entire outer circumferential surface of the boss portion 153 is brought into contact with one point of the inner circumferential surface of the boss coupling groove 123d.

Accordingly, the entire outer circumferential surface of the boss portion 153 is uniformly brought into contact with the inner circumferential surface of the boss coupling groove 123d, not being in intensive contact with any one point thereof. And thus, when the bush bearing is coupled to the outer circumferential surface of the boss portion, any one point of the outer circumferential surface of the bush bearing being brought into intensive contact with the boss coupling groove may be prevented.

Meanwhile, the bush bearing as described above may be provided as a single bush bearing made of a lubricating material as a whole, or may be provided as a double bush bearing in which a lubricating member made of a lubricating material is applied or stacked on an outer circumferential surface of a base member made of metal as described in this embodiment by insert-injection or the like. The following description will be given based on the double bush bearing. However, the present disclosure is to prevent frictional loss or abrasion between the boss portion and the boss coupling groove, more precisely between the outer circumferential surface of the bush bearing and the inner circumferential surface of the boss coupling groove, by substantially uniformly maintaining an outer diameter of the lubricating member, the same may be applicable to the single bush bearing in addition to the double bush bearing.

Figure 3:
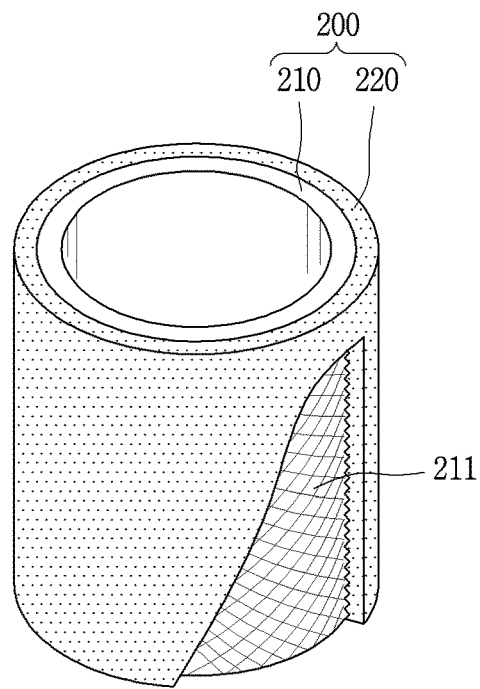
FIG. 3 is a cut perspective view illustrating a part of the bush bearing according to FIG. 1.
Figure 4:
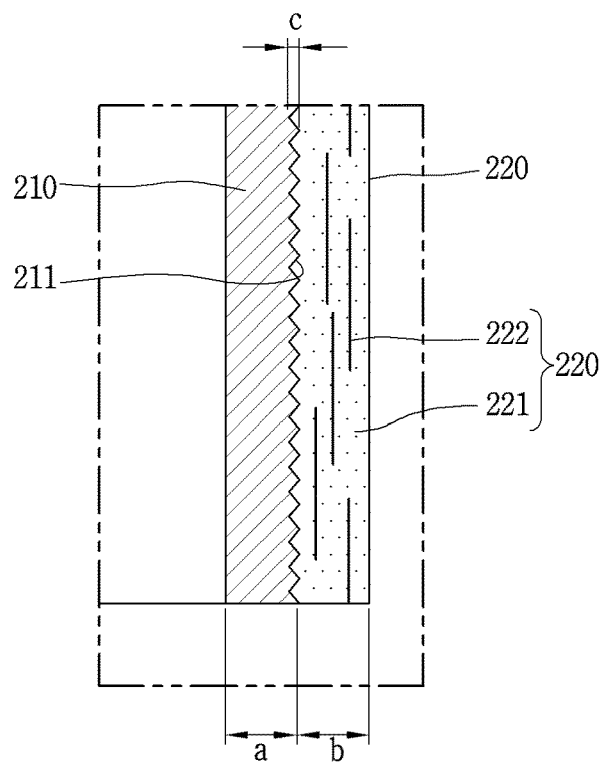
FIG. 4 is a half sectional view illustrating the bush bearing according to FIG. 3.

FIG. 3 is a cut perspective view illustrating a part of the bush bearing according to FIG. 1, and FIG. 4 is a half sectional view illustrating the bush bearing according to FIG. 3.

As illustrated in those drawings, the bush bearing 200 according to this embodiment may include a base member 210 press-fitted into the boss portion and the like of the scroll compressor, and a lubricating member 220 applied or stacked on an outer circumferential surface of the base member 210 to form a lubricating layer.

Generally, the base member 210 may be made of a metal material same as that of the boss portion of the orbiting scroll into which the bush bearing is to be press-fitted, or may be made of a metal material having material property similar to that of the boss portion. Accordingly, the base member 210 may be made of a material having a heat transfer coefficient or having a material property same as that of the boss portion 153. However, the base member 210 is not limited to a metal material, and it may be sufficient as long as a material of the base member 210 has greater rigidity than that of the lubricating member 220. Accordingly, the bush bearing according to this embodiment can be firmly press-fitted into a member into which the bush bearing is press-fitted.

And, since the base member 210 is to be press-fitted into a member such as the boss portion, the base member 210 is formed in an annular cross-sectional shape. But a shape of an inner circumferential surface thereof may not be limited to a round shape, but may be various depending on a shape of a member to be press-fitted. In addition, since the lubricating member 220 is applied or stacked on the outer circumferential surface of the base member 210 by insert-injection, the outer circumferential surface of the base member 210 may be formed in a non-circular cross section shape so that the lubricating member 220 does not spin with no traction.

For example, the outer circumferential surface of the base member 210 is provided with a knurling portion 211 to increase a contact area with an inner circumferential surface of the lubricating member 220. The knurling portion 211 may be formed in a rhombus shape as illustrated in FIG. 3 to prevent the lubricating member 220 from being separated from the base member 210 in a lengthwise direction.

Here, a contact area between the knurling portion 211 and the lubricating member 220 may be increased as a depth of the knurling portion 211 gets deeper, and thus an adhesive force at the contact area may be increased. However, when the depth of the knurling portion is too deep, the rigidity of the base member 210 may be lowered, thereby lowering a coupling force with a member into which the bush bearing 200 is press-fitted.

In view of this, the depth of the nulling portion may be defined as follows. That is, referring to FIG. 2, when a thickness of the base member is a, a thickness of the lubricating member is b, and the depth of the knurling portion is c, they may be formed to satisfy the following ranges.

$b/a$=1.09 to 1.15
$c/a$=0.3 to 0.5

As a result, in a case of the bush bearing having an outer diameter of 29.9 mm, when the thickness of the bearing member is 0.8 to 1.5 mm and the thickness of the lubricating member is 0.45 to 1.15 mm, the depth of the knurling portion may be about 0.24 to 0.75 mm.

On the other hand, when the knurling portion 211 is formed in a rhombus shape, it is not only difficult to extrude the base member 210 to injection-mold the base member, but also slightly hinders smooth flow of the injection-molded material even when injection-molding the lubricating member 220.

Accordingly, the knurling portion 211 may be formed of at least one protrusion provided on the outer circumferential surface of the base member 210 in the lengthwise direction. In this case, not only facilitating the injection-molding of the base member 210, but preventing the lubricating member 220 from being idled with respect to the base member 210, which may be advantageous over the rhombus shape. Also, in this case, the knurling portion 211 may be formed in plural along a circumferential direction as well as the lengthwise direction.

When the plurality of knurling portions 211 are formed on the outer circumferential surface of the base member 210 as described above, the lubricating member 220 is inserted and coupled between the knurling portions 211 to increase bonded area between the base member 210 and the lubricating member 220, and this may result in firmly coupling the lubricating member 220 to the base member 210. In addition, the knurling portions 211 may prevent the lubricating member 220 from being separated in the lengthwise direction and also prevent the lubricating member 220 from being idled in the circumferential direction with respect to the base member 210.

Meanwhile, the lubricating member 220 is inserted into the outer circumferential surface of the base member 210 through insert injection as described above to form a lubricating layer. Therefore, the lubricating member 220 may be made of a material having good oil-free properties, which is a plastic material with ether ketone bonds, that is, polyether ether ketone (PEEK) material. In this case, as illustrated in FIG. 4, it may be preferable to form the lubricating member 220 of a mixture of carbon fibers 222 and PEEK 221 to increase durability.

Of course, the lubricating member 220 may not be fitted by insert-injection but be press-fitted into the outer circumferential surface of the base member 210 as described above. However, in this case, since the lubricating member 220 is a resin base such as PEEK, the coefficient of thermal expansion, a maximum press-fitting range, a minimum press-fitting range, and the like of the lubricating member 220 should be properly considered so that the lubricating member 220 smoothly serves as a bearing without being detached from the base member 210.

To this end, the lubricating member 220 may be attached to the outer circumferential surface of the base member 210 using an adhesive. However, a method of using an adhesive is a relatively complicated manufacturing process. Therefore, insert-injecting the lubricating member 220 into the outer circumferential surface of the base member 210 using a mold is preferable in terms of reliability or mass productivity.

In fact, when the bush bearing 200 is applied to the compressor, the bush bearing 200 should be able to maintain a stable coupling force even at a high operating temperature of the compressor, and also a dimensional change of the bush bearing 200 should be kept to a minimum to reduce a frictional loss between the members. However, when the lubricating member 220 is press-fitted into the outer circumferential surface of the base member 210, the press-fitting range or the like should be accurately calculated as described above, but it may be difficult. When fail to do so, the lubricating member 220 may be deformed in the press-fitting process to make press-fitting force insufficient, and accordingly the lubricating member 220 may be detached from the base member 210. The same applies to the method of using an adhesive. In addition, these methods are not advantageous than the injection method, in mass production also. Therefore, a method of insert-injecting the lubricating member 220 may be preferable.

However, in the method in which the lubricating member 220 is applied or stacked on the outer circumferential surface of the base member 210 by insert-injection, the lubricating member 220 may be deformed in the manufacturing process, and thus an outer diameter of the bush bearing can be formed larger than a designed value.

For example, a process of insert-injecting the lubricating member into the base member is as follows. This process may be referred to as method ①, and will be described with FIGS. 5 to 7.

Figure 5:
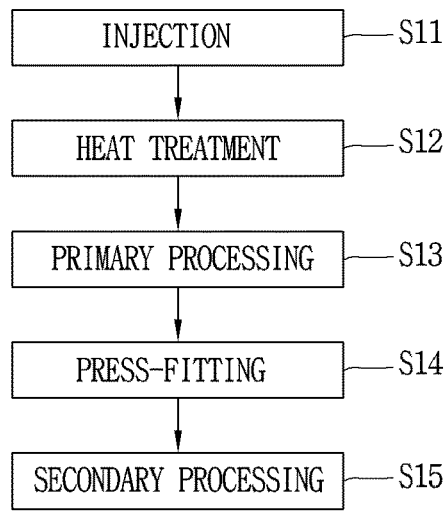
FIG. 5 is a block diagram illustrating a method ① for manufacturing the bush bearing according to FIG. 3.

As shown in FIG. 5, the base member 210 is inserted into a space for injection in a mold, and PEEK and the likes are injected into the same, and then the injection-molded material injected and went through a general curing process is taken out [S11].

After the injection-molded material is heated and goes through annealing heat treatment, temperature of the material is maintained at about 270° C. for about 4 hours, and then cooled at room temperature for about 2 hours. Accordingly, stress in the PEEK due to thermal contraction after injection is reduced [S12].

Next, a length, an inner diameter, and an outer diameter of the injection-molded material that went through heat-treatment are processed through a primary cutting to complete a manufacture of the bush bearing. As a result, an outer diameter of the bush bearing may obtain a desired design value [S13].

Figure 6:
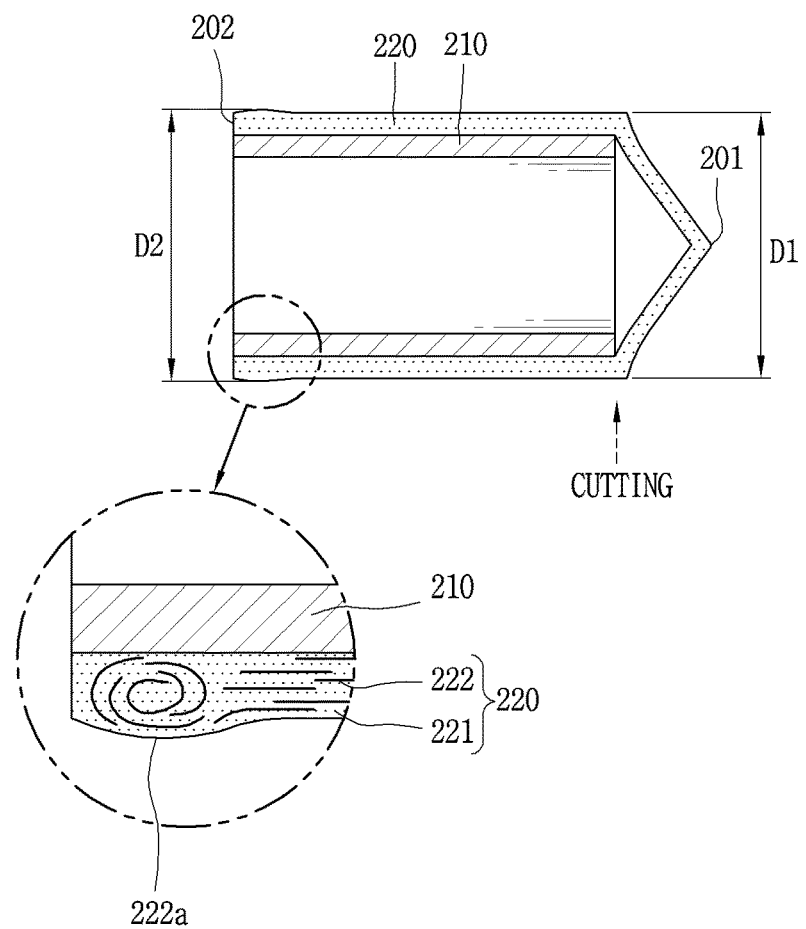
FIG. 6 is a longitudinal sectional view illustrating the bush bearing manufactured according to the method ①.

The bush bearing manufactured through the above process is illustrated in FIG. 6. However, a final outer diameter of the bush bearing manufactured in an order of <injection-→heat treatment→primary processing> as described above may be larger than a designed outer diameter. In other words, it has been recognized that after the injection, the heat treatment, and the first processing, various dimensions of the bush bearing could be precisely controlled.

However, researchers suggesting this embodiment, through many trials, experiments, and analysis, have found that it is more difficult to control the dimensions of the bush bearing due to the related art manufacturing method which proceeds in the order of <injection→heat treatment→primary processing>. This will be described again later by comparing circularities of the bush bearing according to this embodiment.

That is, it has been recognized that when the lubricating member 220 made of a lubricating material is formed through the injection on the outer circumferential surface of the base member 210 made of metal, the lubricating member 220 having heat-sensitive characteristics would be greatly deformed during the injection and the heat treatment. However, the researchers suggesting this embodiment, through researches, have found that under same injection conditions, the lubricating member 220 is more thermally deformed during the cutting process than being deformed during the heat treatment.

For example, when a deformed amount of the lubricating member 220 in the heat treatment is about 1 μm, a deformed amount of the lubricating member 220 in the cutting process is about 7 μm. This may also be seen in an experiment graph of FIG. 10 to be described later. In addition, when the cutting process is performed after the injection and the heat treatment, the lubricating member 220 is a little bit more swollen during the heat treatment to increase a thickness of the lubricating member 220, and an amount to be cut is further increased to that extent. Thus, cutting heat increases significantly as cutting resistance generated during the cutting process increases. As a result, although the lubricating member 220 is cut according to a designed value, a thickness of the lubricating member 220 is thicker than the designed value.

Accordingly, when measuring a circularity of the bush bearing after completion of the primary cutting process, the outer diameter of the lubricating member 220 is larger than the desired design value despite the final cutting is processed to reach the desired design value with respect to the outer diameter of the lubricating member 220.

Further, in addition to the PEEK 221, the injection-molded material may include additives such as carbon fibers 222 as described above to improve abrasion resistance or mechanical properties of the lubricating member 220. However, in this case, an additive bundle 222a is formed as the additives are injected together with PEEK to generated a kind of vortex at an end portion 202 (hereinafter, rear end) opposite to a side where the injection-molded material is injected 201 (hereinafter, front end), and the additive bundle 222a increases a thickness of the rear end of the lubricating member 220 to further increase the cutting heat during the cutting process. Accordingly, a difference between a front end outer diameter D1 and a rear end outer diameter D2 of the bush bearing 200 could be further increased.

Thus, this embodiment is disclosing a method of manufacturing the bush bearing that can efficiently control the dimensions of the bush bearing by minimizing thermal deformation of the lubricating member 220. This is called a method according to this embodiment. This will be described later in more detail.

Meanwhile, the bush bearing manufactured as described above is press-fitted into the boss portion of the orbiting scroll and inserted into the boss coupling groove, thereby combining the rotating shaft and the orbiting scroll as described above. At this time, the outer diameter of the bush bearing is cut once again in a state press-fitted into the boss portion.

Figure 7:
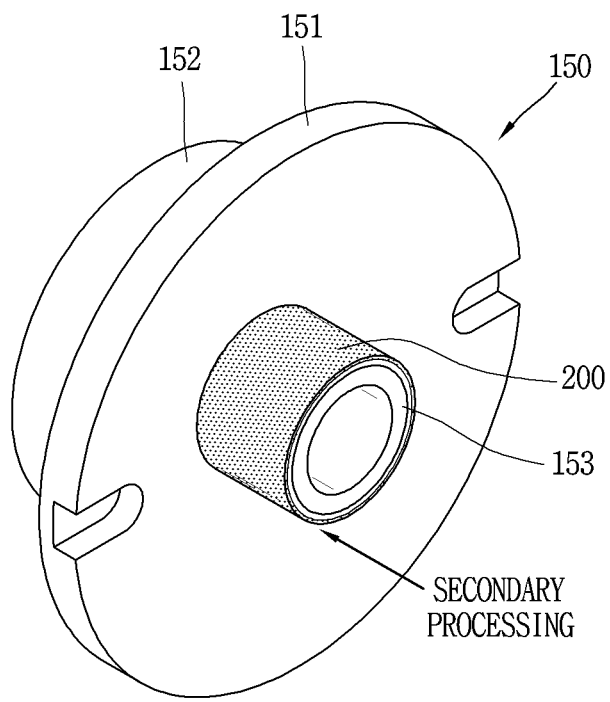
FIG. 7 is a perspective view illustrating a secondary processing performed in a state in which the bush bearing manufactured according to the method ① is press-fitted into a boss portion of an orbiting scroll.

This will be described with reference to FIGS. 5 and 7 as follows.

That is, the bush bearing 200 primarily-processed is press-fitted into the outer circumferential surface of the boss portion 153.

Next, the outer diameter of the bush bearing 200 processed through a secondary cutting so that the outer diameter of the bush bearing 200 properly corresponds to the outer diameter of the orbiting scroll 150 in a state press-fitted into the outer circumferential surface of the boss portion 153. As a result, the outer diameter of the bush bearing 200 may obtain a desired design value [S15].

However, as described above, the final outer diameter of the bush bearing coupled to the boss portion by further proceeding in the order of <injection→heat treatment→primary processing> and then <press-fitting→secondary processing> may be larger than a designed outer diameter.

Thus, as described above, this embodiment minimizes thermal deformation of the lubricating member 220 which may occur during the cutting process, by proceeding the primary cutting process (hereinafter, primary processing) on the insert-injected material, and then proceeding the secondary cutting process (hereinafter, secondary processing) after press-fitting the heat-treated bush bearing into the boss portion. That is, this embodiment proceeds in an order of <injection→primary processing→heat treatment→press-fitting→secondary processing>.

Figure 8:
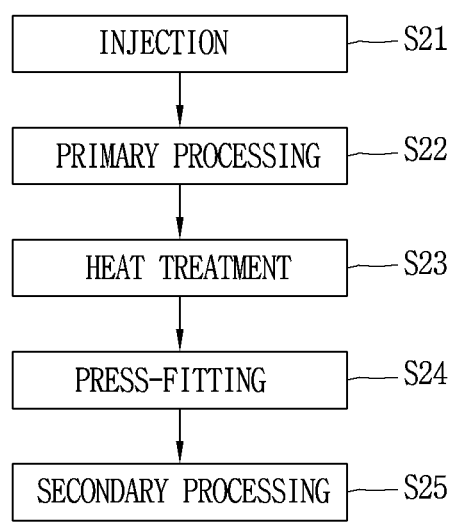
FIG. 8 is a block diagram illustrating a method ② for manufacturing the bush bearing according to FIG. 3.

For example, as shown in FIG. 8, the insert-injected material is produced by applying the lubricating member 220 on the outer circumferential surface of the base member 210 through the insert-injection process described in the method ① [S21].

Figure 9A:
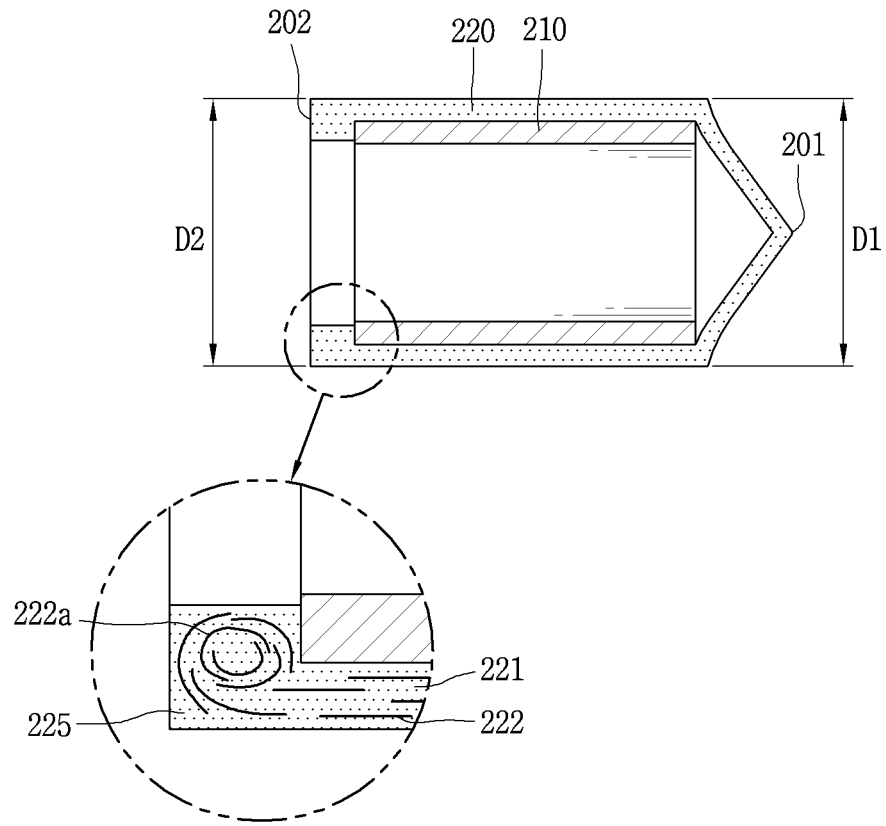
FIGS. 9A and 9B are longitudinal sectional views illustrating the bush bearing manufactured according to the method ②.

However, in this embodiment, an over-molding portion 225 is further formed at one end of the lubricating member 220 as shown in FIG. 9A. To this end, an over-molding space extending from a rear end of the injection-molded material of both ends of the base member 210 is provided in a mold. The over-molding space is a space to form the over-molding portion 225 at the rear end of the injection-molded material. Accordingly, in the material processed through the injection, the over-molding portion 225 is extended longer than the end portion of the base member 210 which is opposite to a side where the injection-molded material is injected.

In addition, the carbon fibers 222 are injected together with the PEEK 221 in the injection-molded material, which are arranged long in a direction in which the injection-molded material is injected. However, a side opposite to a molding inlet side in which the injection-molded material is injected, that is, the rear end 202, is blocked, so that the PEEK 221, the injection-molded material, and the carbon fibers 222, the additives, form a kind of vortex by flow pressure of the injection-molded material as described above. Accordingly, the carbon fibers 222 having grains in the PEEK 221 and the carbon fibers 222 are agglomerated to form a fiber bundle 222a which is the additive bundle.

However, in this embodiment, as the over-molding space extending from the molding space is further formed outside the rear end of the base member 210, the fiber bundle 222a is not formed in the molding space but is formed in the over-molding space. This forms the over-molding portion 225 in the injection-molded material. The over-molding portion 225 does not exist in a range of the base member 210 but is formed of a material constituting the lubricating member 220 only outside the range of the base member 210.

Next, the injection-molded material is taken out from the mold, and the outer diameter is primarily-processed [S22].

For example, when a desired final outer diameter of the bush bearing is 29.9 mm, when an outer diameter of the injection-molded material taken out from the mold is about 30.6 mm, approximately 0.5 to 0.6 mm the outer diameter of the injection-molded material is cut through the primary processing.

Figure 9B:
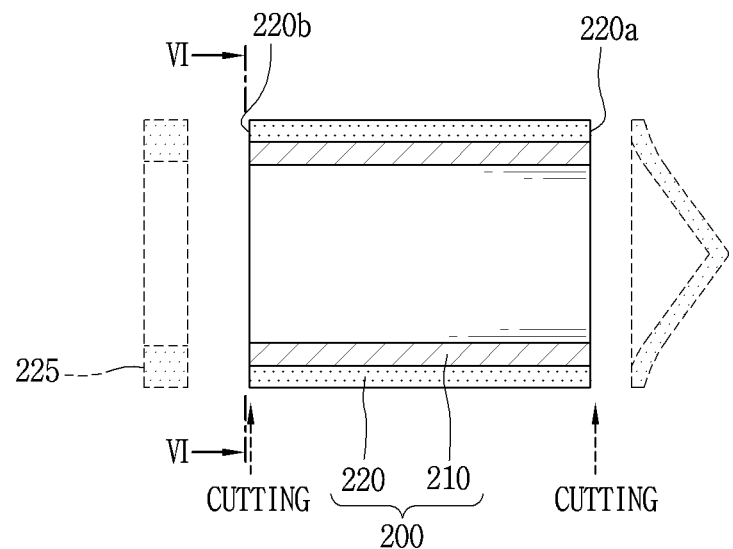
Figure 10:
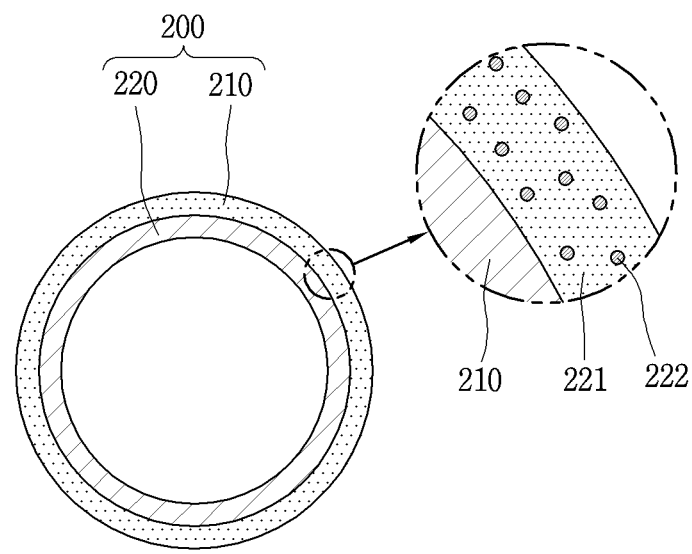
FIG. 10 is a sectional view taken along the line "VI-VI" of FIG. 9B.

In addition, in the primary processing, both the inner diameter of the base member 210 forming the inner circumferential surface of the bush bearing 200 and a length of the lubricating member 220 forming the outer circumferential surface are cut. At this time, as illustrated in FIG. 9B, the front end 201 constituting the molding inlet is cut, and the over-molding portion 225 of the rear end 202 opposite to the front end 201 is cut and removed. Then, the injection-molded material has a cylindrical shape having a final length of the bush bearing 200. Thus, as illustrated in FIG. 10, cut surfaces of the carbon fibers 222 may be exposed outside at a front surface 220a and a rear surface 220b of the lubricating member 220, respectively.

Next, the bush bearing is formed by performing annealing heat treatment on the injection-molded material in the condition described in the above method ① [S23].

Accordingly, an internal stress of the PEEK material forming the lubricating member 220 is reduced. In this process, the lubricating member 220 may swell slightly, but this is only negligible compared to the deformation caused by the cutting heat in the primary processing.

Figure 11:
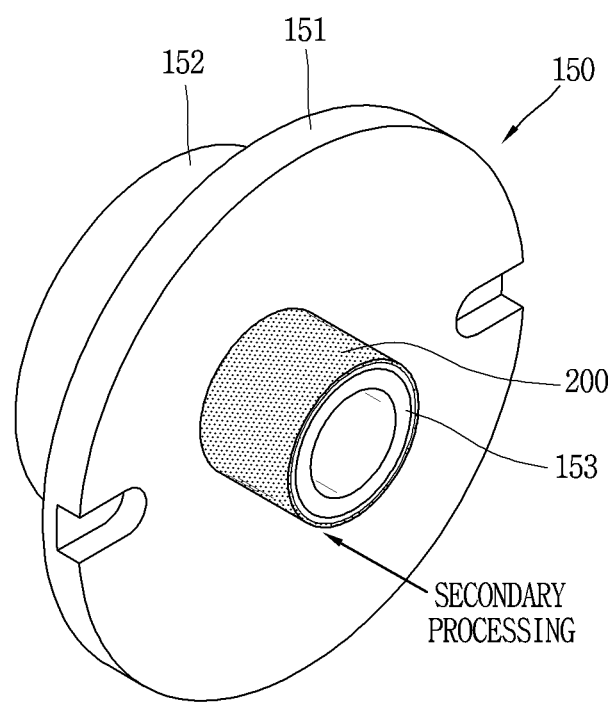
FIG. 11 is a perspective view illustrating a secondary processing performed in a state in which the bush bearing manufactured according to the method ② is press-fitted into a boss portion of an orbiting scroll.

Next, as illustrated in FIG. 11, the heat-treated bush bearing 200 is press-fitted into the outer circumferential surface of the boss portion 153 [S24]. Then, the secondary cutting process is proceeded to cut the outer diameter of the bush bearing 200 in a state press-fitted into the boss portion 153 [S25].

For example, when about 0.5 to 0.6 mm is processed in the primary processing, the outer diameter of the bush bearing may reach an initial design value of 29.9 mm by processing about 0.1 to 0.2 mm in the secondary processing.

Accordingly, relatively high cutting heat is generated as cutting relatively a lot in the primary processing, and thus the lubricating member 220 may be additionally deformed. But further deformation of the lubricating member 220 may be minimized by cutting relatively little in the secondary processing to generate relatively low cutting heat. Accordingly, as a remaining part is cut and removed in the secondary processing, an original design value for the outer diameter of the bush bearing can be satisfied.

Figure 12:
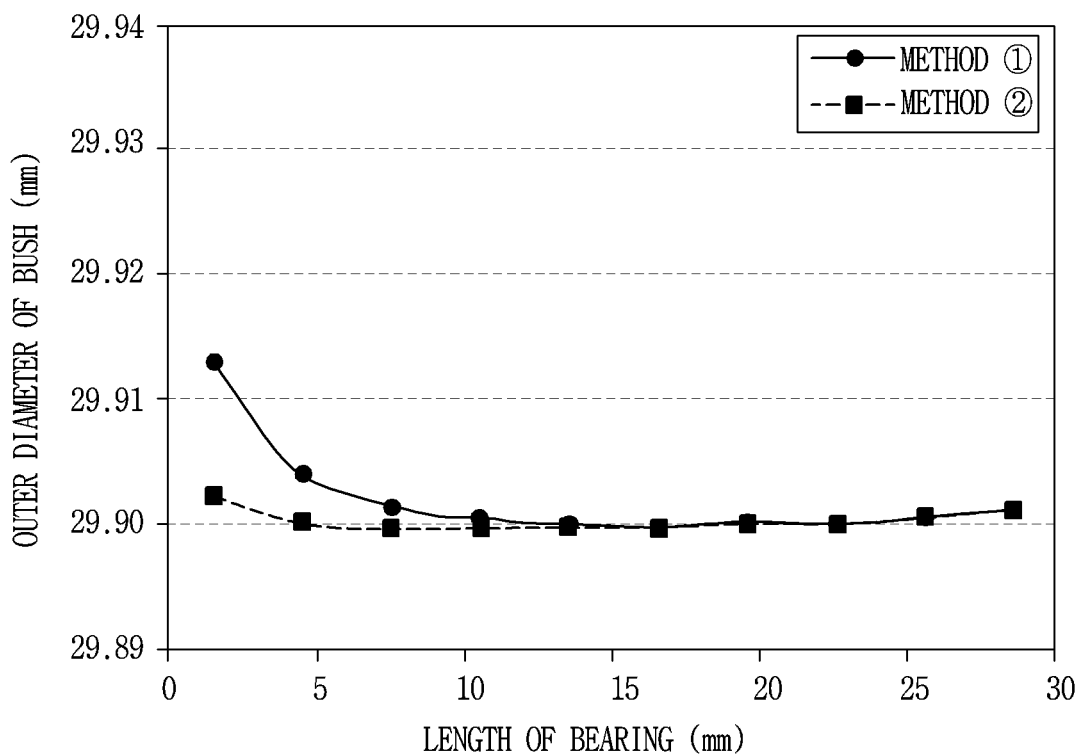
FIG. 12 is a graph showing comparison results of changes in an outer diameter of a lubricating member according to a method for manufacturing a bush bearing.

FIG. 12 is a graph showing comparison of changes in the outer diameter of the lubricating member according to the methods for manufacturing the bush bearing. In this graph, the outer diameter of the bearing is compared and analyzed by proceeding the above described two processing methods after manufacturing the lubricating member made of the PEEK and carbon fibers on the outer circumferential surface of the base member by insert-injection method.

As shown in the graph, when the bush bearing is manufactured by the method ① of proceeding heat treatment after injection, and then cutting the outer diameter of the injection-molded material, the bush bearing maintains almost the same outer diameter from the front end constituting the molding inlet to a vicinity of the rear end of the opposite side thereof. However, it can be seen that the outer diameter increases rapidly as approaching the rear end. This is because the outer diameter of the lubricating member 220 made of PEEK material is greatly deformed as a cutting resistance generated during cutting process increases significantly at the rear end of the bearing.

In particular, in the case of the method ①, as the over-molding space is not formed in the mold, the over-molding portion is not formed in the injection-molded material, so that an additive bundle (fiber bundle) is formed in the vicinity of the rear end of the bearing. Accordingly, the additive bundle not only increases an amount to be cut in the cutting process, but also increases the cutting resistance to increase cutting heat to that extent. And this makes the outer diameter of the bearing at the rear end significantly larger compared to the outer diameter at the front end.

On the other hand, in the case of manufacturing the bush bearing by the method of performing the primary processing after injection, and proceeding heat treatment, then performing the secondary cutting process (hereinafter, method ②), the bush bearing maintains almost the same outer diameter from the front end constituting the molding inlet to an end the rear end of the opposite side thereof. Of course, the outer diameter of the bearing at the rear end is slightly increased, but this is negligible compared to the case of the method ①. This is because, when the lubricating member 220 of the bush bearing is formed according to the method ②, the cutting heat may be lowered in the case where the outer diameter of the injection-molded material is processed by the primary processing and the secondary processing, respectively, compared to the case where the outer diameter is processed deeply at one time. And this may result in minimizing deformation of the lubricating member 220 made of PEEK material due to the cutting heat. Further, in the method ②, the over-molding space is formed in the mold to form the over-molding portion 225 in the injection-molded material, and the fiber bundle 222a is formed in the over-molding portion 225, then the fiber bundle 222a is cut and removed. This method prevents the cutting heat from being increased as the fiber bundle 222a is gathered in the rear end. Accordingly, rapid increase in the outer diameter of the bearing may be suppressed as in the method ①.

Figure 13:
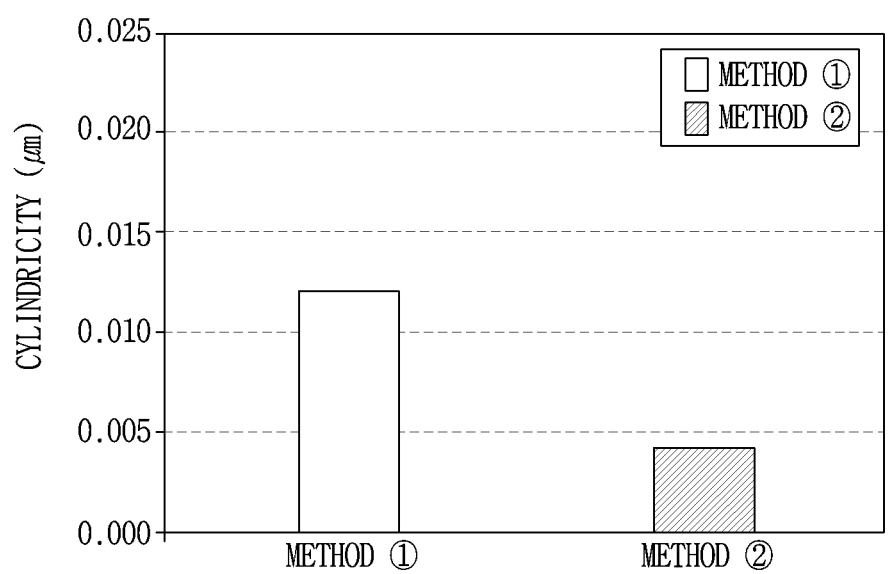
FIG. 13 is a graph showing comparison results of cylindricity of a lubricating member according to a method for manufacturing a bush bearing.

This may also be seen by comparing the cylindricities in FIG. 13. That is, FIG. 13 is showing the comparison of the outer circumferential cylindricities for each bush bearing manufactured according to the method ① and the method ②, they are average values of the cylindricities of each of the plurality of the bush bearings according to each of the methods. Here, the outer circumferential surface cylindricity value is a value obtained by measuring the outer diameters of a plurality of positions in a range from the front end to the rear end of each bush bearing, and obtaining an average of the outer diameter change values of the plurality of positions.

As shown in the graph, an average cylindricity (hereinafter, cylindricity) is about 12 μm in the method ①, while a cylindricity is about 4 μm in the method ②. That is, when an average thickness of the lubricating member is approximately 1 mm in the bush bearing applied to this embodiment, the cylindricity in the method ① is approximately 1.2%, but the cylindricity in the method ② is approximately 0.4% relative to the average thickness of the lubricating member. Therefore, considering measurement errors, the cylindricity may be within 0.5 to 0.6%. However, as previously seen, since the cylindricity in the method ① can be at least 1%, the cylindricity in the method ② is greatly improved by approximately ⅓ compared to the method ②.

In addition, when the average thickness of the bush bearing applied to this embodiment is about 1.95 mm, the cylindricity in the method ① is approximately 0.62%, while the cylindricity in the method ② is approximately 0.2% relative to the average thickness of the bush bearing. Therefore, considering measurement errors, the cylindricity may be within 0.3 to 0.4%. However, as previously seen, since the cylindricity in the method ① can be at least 0.62%, the cylindricity in the method ② is greatly improved by approximately ½ compared to the method ①.

This is because deformation in the outer diameter at one end (rear end) of the bush bearing is more suppressed to improve the cylindricity in the case of the method ②, compared to the case of the method ①, eventually the outer diameter changes in the bearing bush may also be reduced in the method ②, compared to the method ①. This can be seen with reference to FIG. 10 again. That is, in the case of the method ②, a difference of outer diameters of both ends of the lubricating member is about 1 to 2 μm, and this value may be within 3% of the average thickness of the lubricating member, even considering a machining error. Meanwhile, in the method ①, a difference in the outer diameters of both ends of the lubricating member is about 7 to 8 μm.

A small cylindricity as the above means that a change in the outer diameter of the bush bearing is not big. Therefore, when the cylindricity is small, the outer diameter of the bushing bearing may be processed in a uniformed depth, so that the outer diameter of the bushing bearing can be easily controlled to that extent and this may result in improving the reliability of the bearing.

On the other hand, when the bush bearing 200 is applied to the scroll compressor as described above, the change in the outer diameter of the bush bearing 200 greatly affects the performance or reliability of a corresponding product.

For example, as described above, the bush bearing 200 may be press-fitted into the boss portion 153 of the orbiting scroll 150 to serve as a bearing between the boss coupling groove 123d of the rotating shaft 123 and the boss portion 153.

In this case, the outer diameter of the lubricating member 220 of the bush bearing according to the method ① is not uniform and increases greatly toward the rear end (lower end) 202, this makes it difficult to uniformly control the outer diameter of the bush bearing 200. That is, when the outer diameter of the bush bearing 200 is uniformly changed, a final outer diameter may match the original design value by deeply processing the outer diameter of the bush bearing 200 as a whole. However, when only a part of the outer diameter of the bush bearing 200 is abnormally deformed, it becomes difficult to uniformly control by processing the outer diameter entirely.

This brings the outer circumferential surface of the bush bearing 200 into excessively close contact with the inner circumferential surface of the boss coupling groove 123d to generate frictional loss, and at the same time, uneven abrasion of the bush bearing 200 may occur. As a result, an inclination of the orbiting scroll 150 is increased to occur refrigerant leakage in the compression chamber, and thus compression efficiency may be lowered.

On the other hand, in the bush bearing 200 according to the method ②, as the outer diameter of the lubricating member 220 is uniformly maintained, frictional loss between the outer circumferential surface of the bush bearing 200 and the inner circumferential surface of the boss coupling groove 123d and uneven abrasion of the bush bearing can be suppressed, even if the bush bearing 200 is press-fitted into the boss portion 153. In addition, a leakage in the compression chamber may be suppressed by suppressing an inclination of the orbiting scroll 150.

In particular, when the bush bearing 200 is applied to the scroll compressor, the above-mentioned problems may be further exacerbated as the lubricating member 220 is thermally expanded by the heat generated during operation of the compressor. The thicker the lubricating member 220 is, the greater a degree of thermal expansion is.

However, in the bush bearing 200 according to the method ② of this embodiment, as the thickness of the lubricating member 220 is maintained substantially constant from the front end (upper end) 201 to the rear end (lower end) 202, an outer diameter D2 at the rear end (lower end) of the bush bearing 200 may hardly increase compared to an outer diameter D1 at the front end (upper end). Accordingly, the degree of thermal expansion of the lubricating member 220 may be kept relatively small by heat generated during operation of the compressor.

Figure 14:
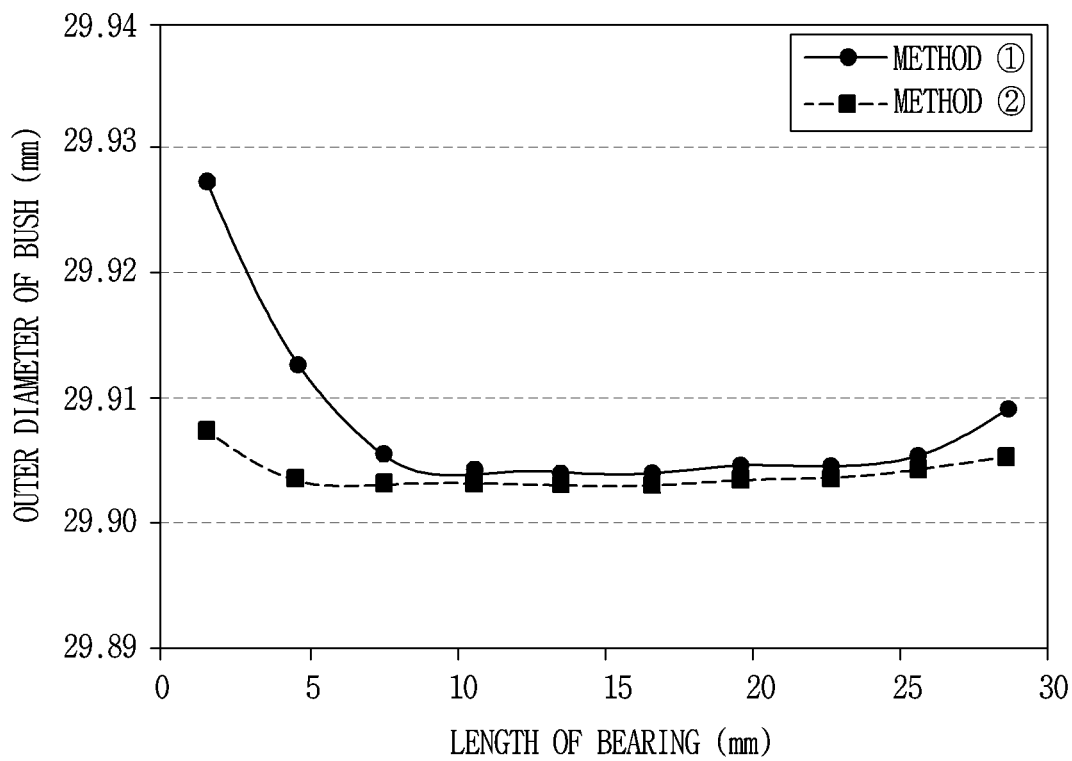
FIGS. 14 and 15 are graphs showing comparison results of changes in an outer diameter and differences in cylindricity of a bush bearing in an operation condition of the scroll compressor according to FIG. 1.
Figure 15:
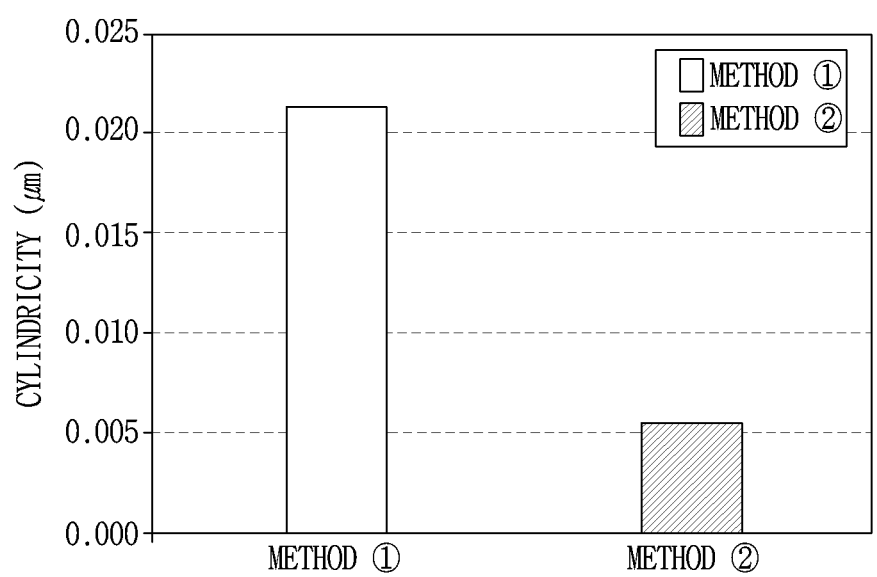

FIGS. 14 and 15 are graphs showing changes in the outer diameter of the bush bearing and differences in the cylindricity after the bush bearing is exposed to same operation conditions (210° C.), when the bush bearing according to the method ① is applied to the scroll compressor and when the bush bearing according to the method ② is applied to the scroll compressor.

As shown in FIG. 14, the outer diameter of the bush bearing is changed by about 22 μm in the method ①, and about 6 μm in the method ② after being exposed to the same operation conditions as described above. This is because the thickness of the lubricating member 220 maintains thinner in the method ② than the thickness in the method ①.

This may also be seen by comparing the cylindricities in FIG. 15. In other words, when comparing the changes in the cylindricity of the outer circumferential surface of the bush bearing after being exposed to the above operation condition, the changes in the cylindricity is small in the case of the method ② compared to the case of the method ①. In the case of the method ①, the average cylindricity is about 22 μm, whereas in the case of the method ②, the average cylindricity is about 6 μm.

In addition, the changes in the cylindricity of the outer circumferential surface of the bush bearing after the compressor has been operated under the above operation conditions show that the cylindricity of the outer circumferential surface in the method ① is approximately 1.13%, while the cylindricity of the outer circumferential surface in the method ② is approximately 0.31% of the average thickness of the bush bearing when a designed average thickness value of the bush bearing applied to this embodiment is approximately 1.95 mm. Therefore, considering measurement errors, etc., the cylindricality of the outer circumferential surface of the bush bearing 200 according to this embodiment may be within 0.5%. Accordingly, it can be seen that the method ② has significantly improved with a cylindricity difference of about ¼ to ⅓ compared to the method ①.

In other words, when comparing the differences in the cylindricity of each bush bearing manufactured according to the method ① and the method ② under the above operation condition, the thermal deformation is little in the case of the method ② compared to the case of the method ①. In view of controlling a distance between the bushing bearing and the boss coupling groove within 100 μm, it can be expected to show a significant effect.

As a result, in the case of the method ②, the cutting heat generated during the cutting process is lowered to keep the thickness increase of the actual lubricating member 220 to a minimum, and when applied to the compressor, thermal expansion due to the operating heat of the compressor may be kept to a minimum. Accordingly, the change in the overall outer diameter of the bush bearing is significantly smaller than in the case of the method ①, thereby increasing the performance and reliability of the compressor to which the bush bearing is applied. In view of controlling the distance between the bushing bearing and the boss coupling groove within 100 μm, it can be expected that applying the bushing bearing according to the method ② to the compressor will be more effective in increasing the performance and reliability of the compressor.

Meanwhile, the above-described embodiments are related to a double bush bearing in which the base member made of steel forms the inner circumferential surface and the lubricating member made of the lubricating material forms the outer circumferential surface, but in some cases the same may be applied to a single bush bearing in which the entire bush bearing is made of the lubricating material.

As described above, in the case of the single bush bearing, since the thickness of the lubricating member is thicker than that of the double bush bearing, it may be more advantageous in terms of the above-described effect. A detailed description thereof will be replaced with the description of the double bush bearing.

The invention claimed is:

1. A bush bearing having an outer lubricating layer, the bush bearing comprising:
    a base member having a cylindrical shape without separated surfaces along a circumferential direction; and
    a lubricating member made of a material having a lower rigidity than the base member, the lubricating member having a cylindrical shape without separated surfaces along the circumferential direction by being integrally provided on an outer circumferential surface of the base member,
    wherein a cylindricity of an outer circumferential surface of the lubricating member satisfies a value that is within 0.6% of an average thickness of the lubricating member.

2. The bush bearing of claim 1, wherein a difference of outer diameters of both ends of the lubricating member is within 3% of an outer diameter of the lubricating member.

3. The bush bearing of claim 1, wherein the outer circumferential surface of the base member is provided with a knurling portion to increase a contact area with an inner circumferential surface of the lubricating member.

4. The bush bearing of claim 3, wherein the base member, the lubricating member, and the knurling portion satisfy a range of b/a=1.09 to 1.15, c/a=0.3 to 0.5 when a thickness of the base member is a, a thickness of the lubricating member is b, and a depth of the knurling portion is c.

5. The bush bearing of claim 1, wherein the lubricating member has carbon fiber contained in a resin base.

6. The bush bearing of claim 5, wherein the resin base is made of polyether ether ketone (PEEK) material.

7. The bush bearing of claim 5, wherein the carbon fiber is arranged in a lengthwise direction of the base member.

8. The bush bearing of claim 7, wherein the carbon fiber has cut surfaces exposed on both ends of the lubricating member.

9. The bush bearing of claim 1, wherein the lubricating member has cutting surfaces on both ends thereof.

10. The bush bearing of claim 1, wherein the cylindricity of the outer circumferential surface of the lubricating member satisfies a value that is within 0.3% of an average thickness of the lubricating member after the lubricating member is exposed at 210° C. for 2 hours.

11. A method for manufacturing the bush bearing according to claim 1, the method comprising:
    an injection step of injecting the lubricating member on the outer circumferential surface of the base member;
    a primary processing step of cutting an outer diameter of the injected lubricating member;
    a heat treatment step of performing heat treatment on the primarily-processed lubricating member; and
    a secondary processing step of cutting the outer diameter of the heat-treated lubricating member.

12. The method of claim 11, wherein the injection step is performed to inject polyether ether ketone (PEEK) and carbon fiber constituting the lubricating member together.

13. The method of claim 11, wherein the injection step is performed to form an over-molding portion on an end portion, which is opposite to a side where the material constituting the lubricating member is injected, to be longer than an end portion of the base member, and
    the primary processing step is performed to remove the over-molding portion in a cutting manner.

14. The method of claim 11, wherein a processing thickness in the primary processing step is greater than a processing thickness in the secondary processing step.

15. A compressor comprising:
    a first scroll having a first wrap formed on one side surface of a first disk portion;
    a second scroll having a second wrap formed on one side surface of a second disk portion and engaged with the first wrap to form a compression chamber, wherein a boss portion is formed on another side surface of the second disk portion;
    a rotating shaft provided with a boss coupling groove into which the boss portion of the second scroll is inserted; and
    a bush bearing having an outer lubricating layer, press-fitted into an outer circumferential surface of the boss portion so that an outer circumferential surface thereof forms a bearing surface with an inner circumferential surface of the boss coupling groove,
    wherein the bush bearing comprises the bush bearing according to claim 1.

16. The compressor of claim 15, wherein a variation rate of a distance between the outer circumferential surface of the bush bearing and the inner circumferential surface of the boss coupling groove satisfies a value that is within 0.4% of an average thickness of the bush bearing.

17. The compressor of claim 15, wherein a base member is made of a material having a heat transfer coefficient equal to or less than that of the boss portion of the second scroll.

18. The compressor of claim 17, wherein the base member is made of a material having material properties same as the boss portion of the second scroll.

19. The compressor of claim 15, wherein the base member and the lubricating member are formed in a shape without a cut surface along a circumferential direction.

20. A bush bearing having an outer lubricating layer, wherein a lubricating member containing carbon fiber has a cylindrical shape without separated surfaces along a circumferential direction, and a cylindricity of an outer circumferential surface of the lubricating member satisfies a value that is within 0.3% of an average thickness of the lubricating member after the lubricating member is exposed at 210° C. for 2 hours.

* * * * *